(12) United States Patent
Deobald et al.

(10) Patent No.: US 9,676,470 B2
(45) Date of Patent: *Jun. 13, 2017

(54) DISBOND RESISTANT COMPOSITE STIFFENER RUNOUT

(71) Applicant: The Boeing Company, Chicago, IL (US)

(72) Inventors: Lyle R. Deobald, Shoreline, WA (US); Kenneth L. Brook, Seattle, WA (US); Timothy D. Jackson, Everett, WA (US); Kenneth J. Duffie, Mercer Island, WA (US); Gregory B. Doty, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,723

(22) Filed: Mar. 9, 2015

(65) Prior Publication Data

US 2015/0175250 A1 Jun. 25, 2015

Related U.S. Application Data

(62) Division of application No. 13/455,217, filed on Apr. 25, 2012, now Pat. No. 8,974,886.

(51) Int. Cl.
*B64C 1/06* (2006.01)
*B64C 1/12* (2006.01)
(Continued)

(52) U.S. Cl.
CPC .............. *B64C 1/12* (2013.01); *B29C 70/30* (2013.01); *B29D 99/0014* (2013.01);
(Continued)

(58) Field of Classification Search
CPC ................................ B64C 1/064; B64C 3/182
(Continued)

(56) References Cited

U.S. PATENT DOCUMENTS 4,606,961 A 8/1986 Munsen et al.
7,303,374 B2 12/2007 Li et al.
(Continued)

FOREIGN PATENT DOCUMENTS

CN 101674929 3/2010
CN 101795938 8/2010
(Continued)

OTHER PUBLICATIONS

Chinese Office Action from CN Application Serial No. 201310077647X dated Nov. 30, 2015, 14 pages.
(Continued)

*Primary Examiner* — Alexander Thomas
(74) *Attorney, Agent, or Firm* — Miller, Matthias & Hull LLP

(57) ABSTRACT

The disclosure herein provides for disbond resistant stringer runouts. Various aspects may be used independently or in combination to mitigate disbonding associated with the stiffener runout under operational loads. Aspects include a stiffener runout having rounded base flange corners. A recessed notch may be incorporated within the base flange to provide a flange termination point that is forward of the web termination point, allowing the web to terminate prior to the base flange. The web may be trimmed from a full height to a reduced height at the web termination point. The base flange may be co-bonded to the underlying composite structure via a scarf joint. Perimeter clamp radius fillers may be used to concentrate a clamping force around the perimeter of the base flange.

12 Claims, 6 Drawing Sheets

(51) Int. Cl.
| | |
|---|---|
| B29D 99/00 | (2010.01) |
| B29C 70/30 | (2006.01) |
| B64C 3/18 | (2006.01) |
| B64C 3/20 | (2006.01) |
| B64C 3/26 | (2006.01) |
| B32B 37/18 | (2006.01) |
| B32B 38/00 | (2006.01) |
| B64C 1/00 | (2006.01) |

(52) U.S. Cl.
CPC .......... *B32B 37/18* (2013.01); *B32B 38/0004* (2013.01); *B64C 1/064* (2013.01); *B64C 3/182* (2013.01); *B64C 3/20* (2013.01); *B64C 3/26* (2013.01); *B32B 2607/00* (2013.01); *B64C 2001/0072* (2013.01); *Y02T 50/433* (2013.01); *Y10T 156/1062* (2015.01); *Y10T 156/1064* (2015.01); *Y10T 428/24174* (2015.01); *Y10T 428/24182* (2015.01)

(58) Field of Classification Search
USPC .................................................. 428/119, 120
See application file for complete search history.

(56) References Cited

U.S. PATENT DOCUMENTS

| | | | |
|---|---|---|---|
| 7,682,682 B2 | 3/2010 | Leon-Dufour et al. | |
| 8,864,074 B2 | 10/2014 | Flood | |
| 8,974,886 B2 * | 3/2015 | Deobald | ................ B29C 70/30 428/119 |
| 2011/0174927 A1 | 7/2011 | Outon Hernandez et al. | |
| 2013/0101801 A1 * | 4/2013 | Honorato Ruiz | ....... B64C 3/182 428/167 |

FOREIGN PATENT DOCUMENTS

| | | | |
|---|---|---|---|
| EP | 1 566 334 | | 8/2005 |
| WO | WO 2008132498 | | 11/2008 |
| WO | WO 2011/003844 | * | 1/2011 |
| WO | WO 2011003844 | | 11/2011 |
| WO | WO 2012042246 | | 4/2012 |

OTHER PUBLICATIONS

Extended European Search Report from EP 13 16 4683 dated Jul. 3, 2015, 7 pages.

Psarras, S., et al., "Design of Composite Stiffener Runouts for Damage Tolerance", Finite Elements in Analysis and Design 47, pp. 949-954, 2011.

Notice of Allowance dated Oct. 13, 2014 from U.S. Appl. No. 13/455,217.

* cited by examiner

DISBOND RESISTANT COMPOSITE STIFFENER RUNOUT

CROSS-REFERENCE TO RELATED APPLICATIONS

This application is a divisional patent application of U.S. patent application Ser. No. 13/455,217, filed on Apr. 25, 2012, entitled "Disbond Resistant Composite Stiffener Runout," now issued as U.S. Pat. No. 8,974,886, the entire disclosure of which is expressly incorporated by reference in its entirety.

BACKGROUND

Stringers are structural components that are often used to stiffen panels and other structures. With composite panels, composite stringers may be co-bonded, or secondarily bonded, onto the panel to prevent the panel from buckling or otherwise failing when subjected to compressive loads. The combined panel and stringers may then be secured to a substructure.

While stiffeners provide adequate reinforcement of the corresponding composite panel with respect to compressive loads, the stiffener runouts, or areas at which the stringers terminate, may experience disbonding between the stringers and the panel under certain conditions. The sudden discontinuity of the load path, combined with a low composite interlaminar toughness, may result in a structural component that may delaminate or disbond at operational loads.

Traditionally, the disbond potential that exists at the stiffener runout locations of a composite structure has been accommodated via various techniques. For example, the architecture of a composite panel may be designed to move the stiffener terminations to an edge of the panel. However, doing so may negatively affect the cost and weight of the corresponding panel. According to an alternative traditional solution, the disbond may be allowed to occur at operational loads and fasteners used to arrest the disbond. With this solution, extensive certification testing is required and any amount of disbond, even though non-critical, may be disconcerting to a customer.

Another conventional method for controlling disbond at stiffener runout locations includes the use of flat metallic radius fillers secured to the stiffeners at the termination ends. However, these conventional radius fillers are not efficient at arresting the disbond under the flange, and provide no arrest capabilities under a web of a stringer. Relatively large mechanically attached metallic fittings may also be used to transfer loads from stringers into the attached composite structure. A disadvantage of these types of fittings is that the fittings increase the weight of the corresponding structure and may be expensive to install, while not completely suppressing the disbond at operational loads.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for disbond resistant stiffener runouts. According to one aspect, a stiffener runout may include a web and a base flange. The web may be configured in a vertical orientation having a front surface, a rear surface, a bottom edge, a web termination point that is positioned at an outermost location of the web, and web height that decreases from a full height at a location prior to the web termination point to a reduced height at the web termination point. The base flange may include two flanges extending horizontally from the front and rear surfaces of the web, respectively. The base flange may include a flange termination point that is positioned at an outermost location of the base flange, which is forward of the web termination point.

According to another aspect, a method of controlling bondline separation between a composite stiffener and a composite structure may be provided. The method may include providing a composite stiffener having a web and a base flange. The web may terminate at a web termination point, while the base flange terminates at a flange termination point that is forward of the web termination point. The base flange may include rounded corners. The web may be trimmed from a full height prior to the web termination point to a reduced height at the web termination point. A recessed notch may be provided within the base flange at the flange termination point, with the web termination point being positioned at the center of the recessed notch. The base flange may be bonded to the composite structure.

According to yet another aspect, a stiffener runout assembly may include a stiffener runout, a composite structure bonded to the stiffener runout, a pair of perimeter clamp radius fillers, and a number of fasteners. The stiffener runout may include a web trimmed from a full height to a reduced height at the web termination point at an outermost location of the web. The stiffener runout may also include the base flange that extends horizontally in opposite directions from the web and includes a flange termination point at an outermost location of the base flange. The flange termination point may be positioned forward of the web termination point, with the web termination point positioned within a recessed notch of the base flange.

The composite structure may be bonded to the base flange of the stiffener runout at a scarf joint. The pair of perimeter clamp radius fillers may be positioned on a top surface of the base flange on opposing sides of the web. Each perimeter clamp radius filler may include a bottom surface that is configured to contact the top surface of the base flange around the perimeter of the top surface to create a contact area between the perimeter clamp radius filler and the perimeter of the top surface. The contact area may define a relief cavity between the perimeter clamp radius filler and the top surface of the base flange. The fasteners may secure the perimeter clamp radius fillers to the top surface of the base flange, extending through a top surface of the perimeter clamp radius fillers, through the relief cavities, through the base flange, and through the composite structure.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
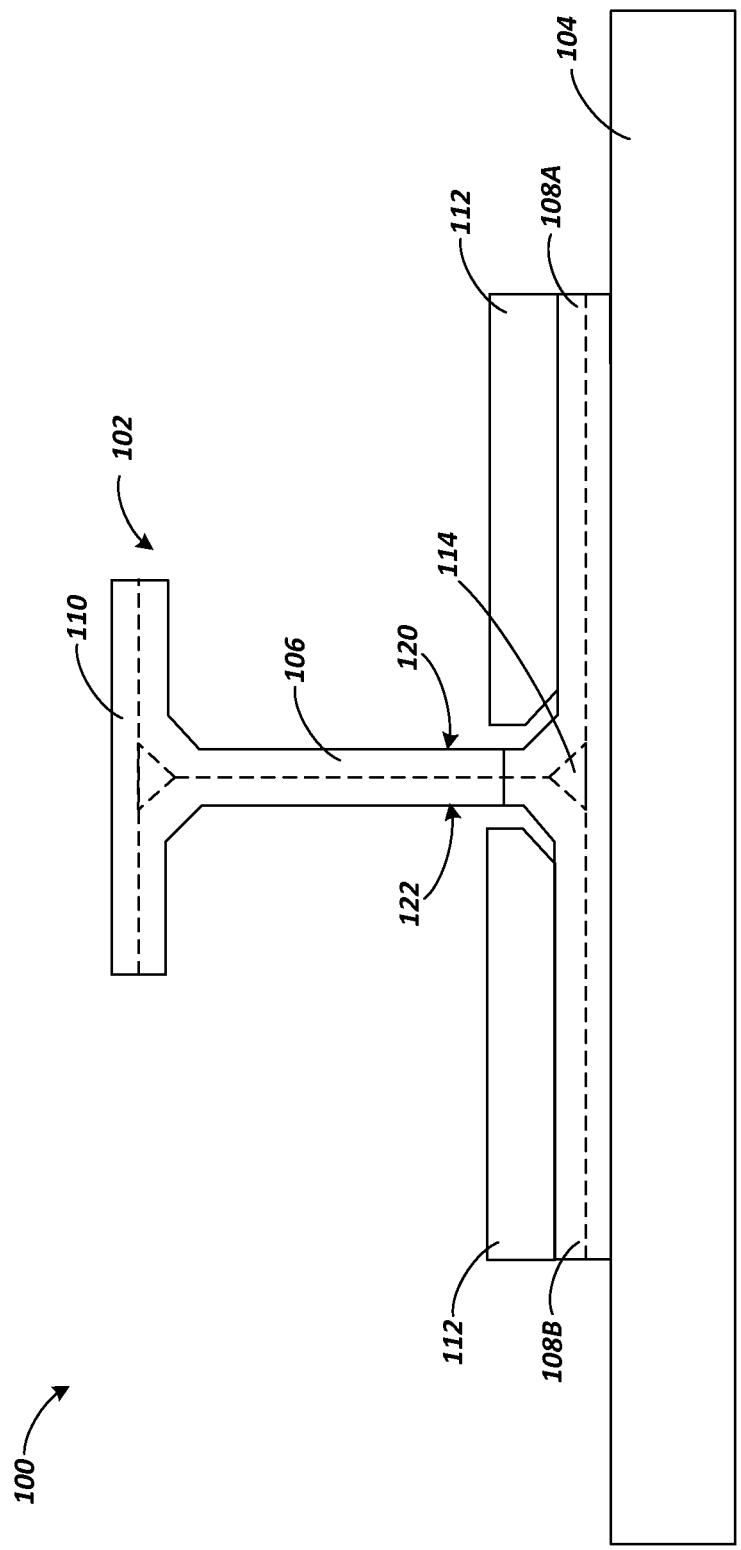
FIG. 1 is a front view of a stiffener runout assembly illustrating aspects of a stiffener runout for controlling disbond according to various embodiments presented herein.

The following detailed description is directed to controlling bondline separation between a composite stiffener and a composite structure. As discussed above, delamination or disbond may occur between stringers and co-bonded composite structures at stringer runout locations when subjected to operational loads. As composite materials are increasingly used in the construction of vehicles such as aircraft, controlling delamination and disbonding at the stringer runout locations is a primary concern. Solutions to the stringer disbonding issue should contemplate weight factors, as well as cost and complexity of manufacturing, particularly within the aircraft industry.

Utilizing the concepts and technologies described herein, stringer runouts may incorporate various stringer runout aspects, alone or in combination, to prevent disbonding between composite stringers and co-bonded composite structures while minimizing weight and manufacturing complexity and cost. The various embodiments described below will be described within the context of a composite aircraft stringer co-bonded with composite aircraft skin. It should be appreciated that the various embodiments are not limited to these specific components, or to use within aircraft. Rather, the concepts described below may equally apply to any implementation in which a stringer or similar stiffening component is bonded to a composite structure.

In the following detailed description, references are made to the accompanying drawings that form a part hereof, and which are shown by way of illustration, specific embodiments, or examples. Referring now to the drawings, in which like numerals represent like elements through the several figures, a disbond resistant stiffener runout and assembly, as well as methods form controlling disbond between a composite stiffener and a composite structure, will be described.

FIG. 1 shows a front view of a stiffener runout assembly 100. According to this illustrative embodiment, the stiffener runout assembly 100 includes a stiffener runout 102 co-bonded onto a composite structure 104. The composite structure 104 may be any composite panel, sheet, or other component for which stiffening would be desirable, such as an aircraft skin. The stiffener runout 102 includes a web 106, a base flange 108 that includes a first flange portion 108A and a second flange portion 108B, and a cap 110. A noodle 114 is bonded within the region created between the web 106 and the first and second flange portions 108A and 108B.

As shown in FIG. 1, the web may extend vertically in relation to the composite structure 104. The base flange 108 may be positioned at a bottom edge of the web 106, with the first flange portion 108A extending substantially horizontally from a front surface 120 of the web 106 and the second flange portion 108B extending substantially horizontally from a rear surface 122 of the web 106. The base flange 108 is bonded to the composite structure 104. According to various embodiments, the stiffener runout assembly 100 may include perimeter clamp radius fillers 112 positioned on the first flange portions 108A and 108B to assist with preventing disbond at the forward edges of the stiffener runout 102. The various features of the perimeter clamp radius fillers 112 will be described in greater detail below with respect to FIGS. 2 and 3. It should be appreciated that the stiffener runout 102 may include additional features and/or varying proportions or configurations as compared to the stiffener runout 102 shown in the figures without departing from the scope of this disclosure. The various figures may not be drawn to scale and are shown for illustrated purposes only.

Figure 2:
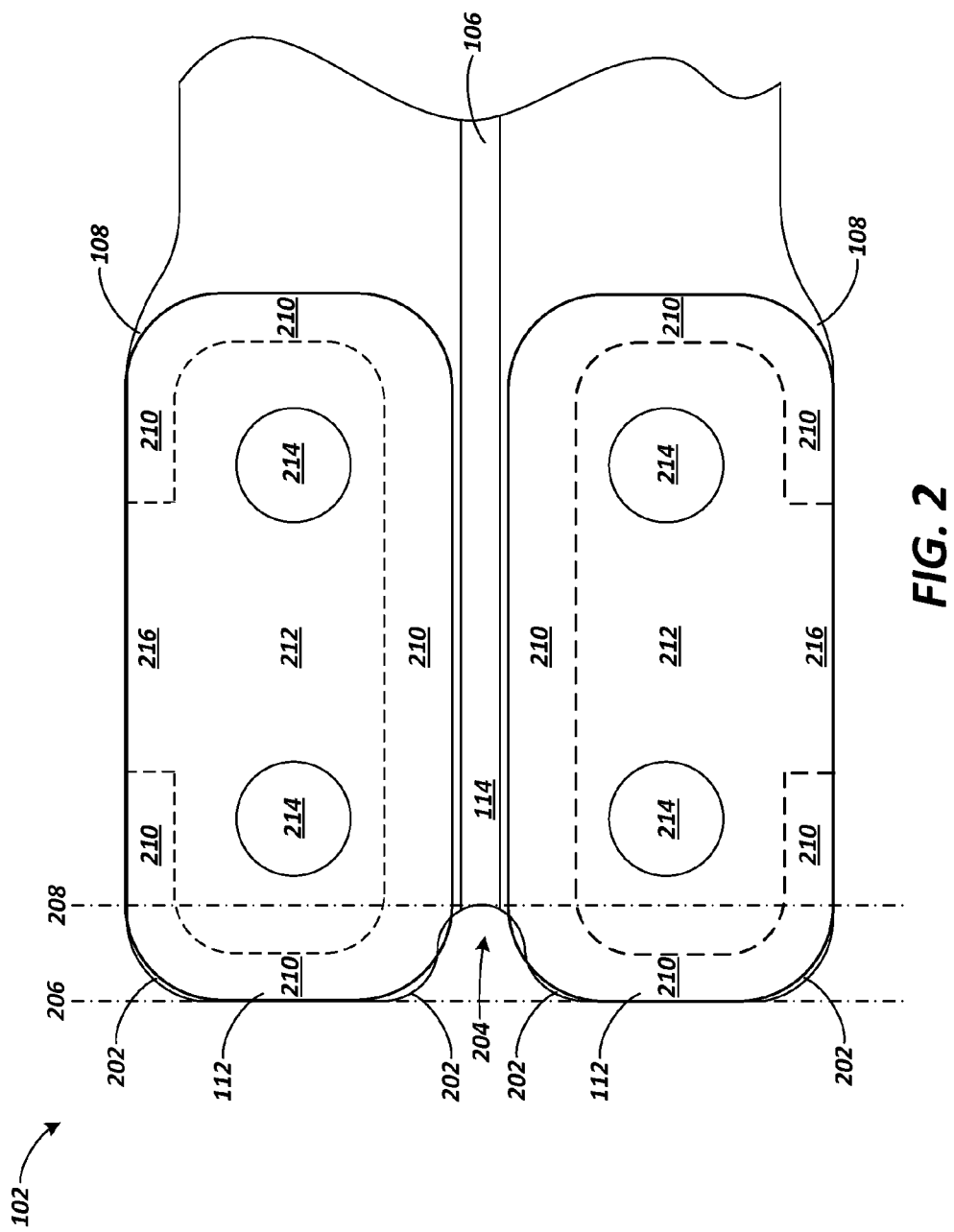
FIG. 2 is a top view of a stiffener runout illustrating aspects of the stiffener runout for controlling disbond according to various embodiments presented herein.
Figure 3:
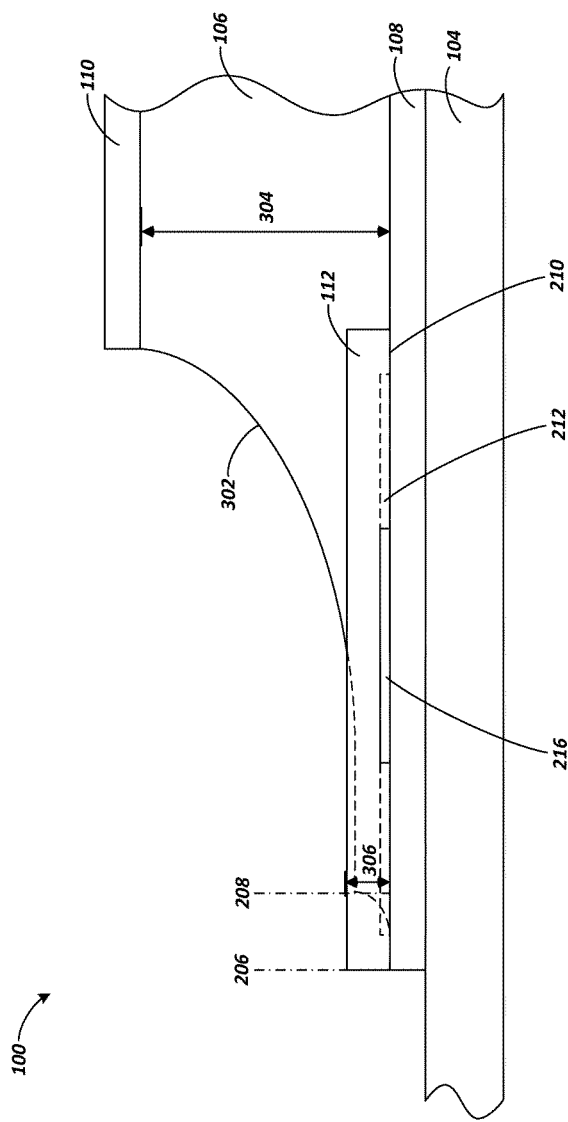
FIG. 3 is a side view of a stiffener runout assembly illustrating aspects of a stiffener runout for controlling disbond according to various embodiments presented herein.

FIGS. 2 and 3 show top and side views, respectively, of a stiffener runout 102 according to one embodiment. As described above, the stiffener runout 102 may include a web 106 and a base flange 108. There are multiple features of the stiffener runout 102 that independently and collectively mitigate or eliminate any disbond between the stiffener runout 102 and the composite structure 104. One such feature includes the rounded corners 202 of the base flange 108. Conventional stiffeners include base flanges that have squared off corners. The square corners are easier to manufacture. Historically, delamination tends to occur at the corners of the base flange first, particularly when a partial shear loading exists. However, by trimming or otherwise creating the rounded corners 202 as shown in FIG. 2, the loads through the corners of the base flange 108 are more easily distributed, reducing the potential for delamination at those locations.

Another feature disclosed herein to control disbonding includes the recessed notch 204 in base flange 108. According to various embodiments, the base flange 108 terminates at a flange termination point 206. The flange termination point 206 may be the most forward location of the stiffener runout 102. Similarly, the web 106 terminates at a web termination point 208. Conventional stiffeners include webs and base flanges that terminate at identical locations. The forward edge of a stringer runout is typically stiffer under the web 106 and noodle 114 as compared to the base flange 108. This stiffer central location of the typical stringer forward edge allows for disbonds to occur at this location before occurring at other locations of the base flange 108.

However, as shown clearly in FIG. 2, the stiffener runout 102 of the various embodiments disclosed herein includes a flange termination point 206 that is forward of the web termination point 208. The web termination point 208 is located within a recessed notch 204, which may be on a semicircular or arcuate edge of the base flange 108 aft of the flange termination point 206. In doing so, any curvature between the termination end of the stiffener runout 102 and the composite structure 104 may be matched, which mitigates the disbonding under the web 106 and noodle 114.

Similarly, as seen in FIG. 3, the web 106 may be trimmed from a full height 304 to a reduced height 306 at the web termination point 208. According to one embodiment, the reduced height 306 may be substantially flush with a top surface of the base flange 108. By tapering or reducing the height of the web 106, the loads within the stringer 102 are reduced at the flange termination point 206, which reduces the potential for disbond. Additionally, reducing the height of the web 106 reduces the stiffness of the stiffener runout 102 along the central axis of the stiffener, which similar to the benefits described above with respect to the recessed notch 204, mitigates the disbonding under the web 106 and noodle 114. According to one embodiment, the leading edge 302 of the web 106 is tapered according to a curved configuration as shown in FIG. 3.

An additional feature used to control disbonding includes the use of the perimeter clamp radius fillers 112, as shown in FIGS. 2 and 3. As discussed above, traditional radius fillers are flat metallic components that may be secured to a base flange in order to provide pressure to the flange and corresponding bond between the flange and the underlying composite structure in an effort to mitigate disbonding. However, traditional radius fillers do not efficiently handle panel deformation. For example, when a composite structure 104 or panel deforms under load such that the panel under a portion of the traditional radius filler flexes downward, the traditional radius filler will tend to lift off of the surface, either over the portion of the panel that is deflecting downward, or as that portion of the radius filler deflects downward with the panel, an opposing edge of the traditional radius filler may lift off the surface.

The perimeter clamp radius fillers 112 described herein alleviate these deficiencies of traditional radius fillers by concentrating the clamping force around the perimeter of the base flange 108 where the disbonding is most likely to occur. Moreover, a relief cavity 212 within a central portion of the perimeter clamp radius filler 112 accommodates any deformation of the composite structure 104 and the corresponding base flange 108. The perimeter clamp radius fillers 112 may be metallic, or any other suitable material.

According to one embodiment, each perimeter clamp radius filler 112 includes a bottom surface that projects downward from a portion of the perimeter of the radius filler to create a contact area 210 between the perimeter clamp radius filler 112 and a corresponding portion of the top surface around a perimeter of the base flange 108. The contact area 210 defines the boundaries of the relief cavity 212. Pressure is applied to the base flange 108 by the perimeter clamp radius filler 112 within the contact area 210 to prevent disbonding at the edges of the stiffener runout 102. Because pressure applied to the perimeter clamp radius filler 112 is distributed and concentrated around the perimeter of the base flange 108 while allowing for deformation within the relief cavity 212, the perimeter clamp radius fillers 112 provide a significant advantage over the less effective conventional radius fillers.

According to various embodiments, the contact area 210 may be substantially C-shaped with an opening 216 that provides access to the relief cavity 212 from one edge of the base flange 108. The opening 216 may be positioned along the edge of the base flange 108 opposite the web 106 as shown in FIGS. 2 and 3 since that portion of the edge opposite the web 106 is not highly susceptible to disbonding. The opening 216 may alternatively be positioned at the most rearward edge or any other edge of the base flange 108, and may be configured according to any size and shape. According to one embodiment, the relief cavity 212 may be filled with a compliant filler, such as a sealant or other material appropriate to the particular application, that allows for deformation without applying pressure to the base flange 108. The opening 216 may provide a passage for excess compliant filler to escape from the relief cavity 212 during installation.

Fasteners 214 may be threaded or otherwise placed through corresponding apertures in the perimeter clamp radius filler 112, base flange 108, and composite structure 104. Torque applied to the fasteners 214 transfers force from the perimeter clamp radius filler 112 to the perimeter of the base flange 108 via the contact area 210 to prevent disbonding. Although two fasteners 214 are shown for each perimeter clamp radius filler 112, any number of fasteners 214 may be used without departing from the scope of this disclosure.

Figure 4:
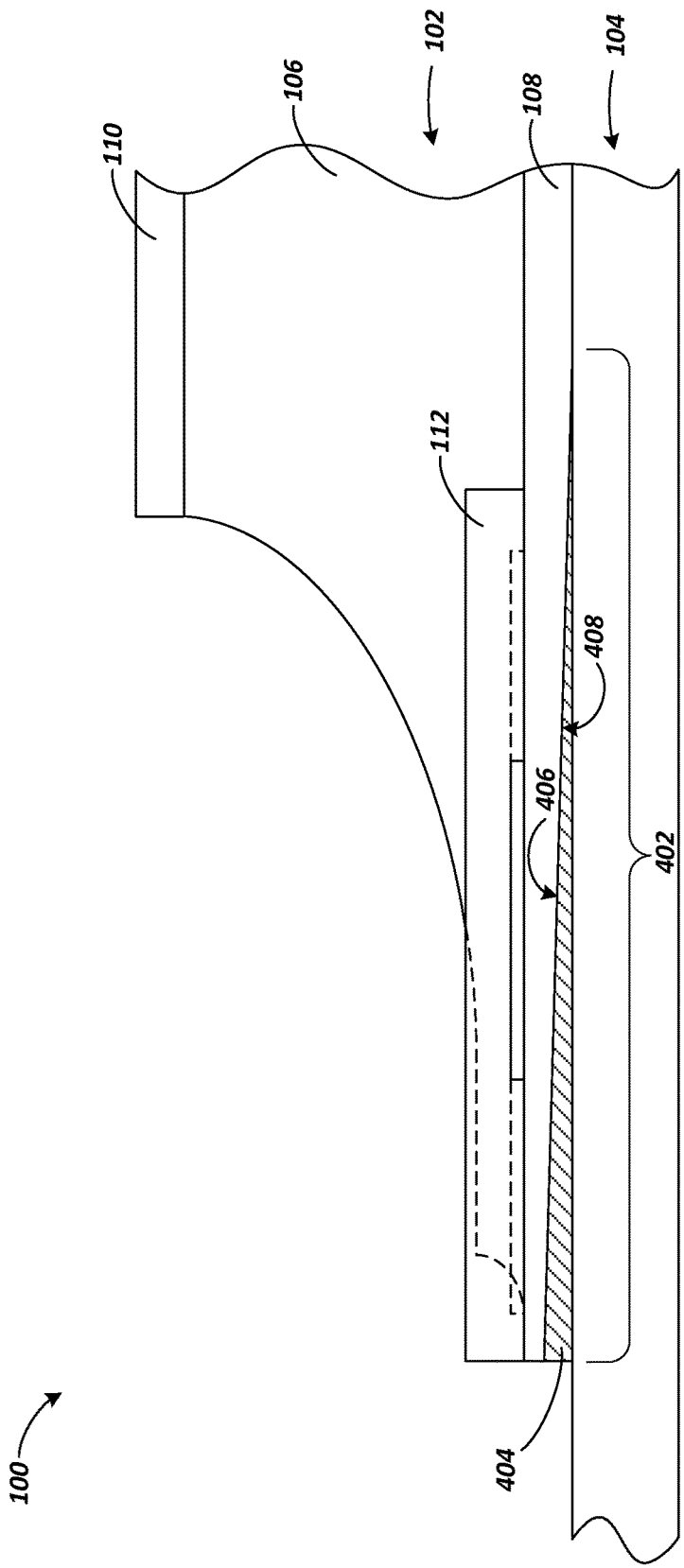
FIG. 4 is a side view of a stiffener runout assembly illustrating aspects of a stiffener runout and scarf joint for controlling disbond according to various embodiments presented herein.
Figure 5:
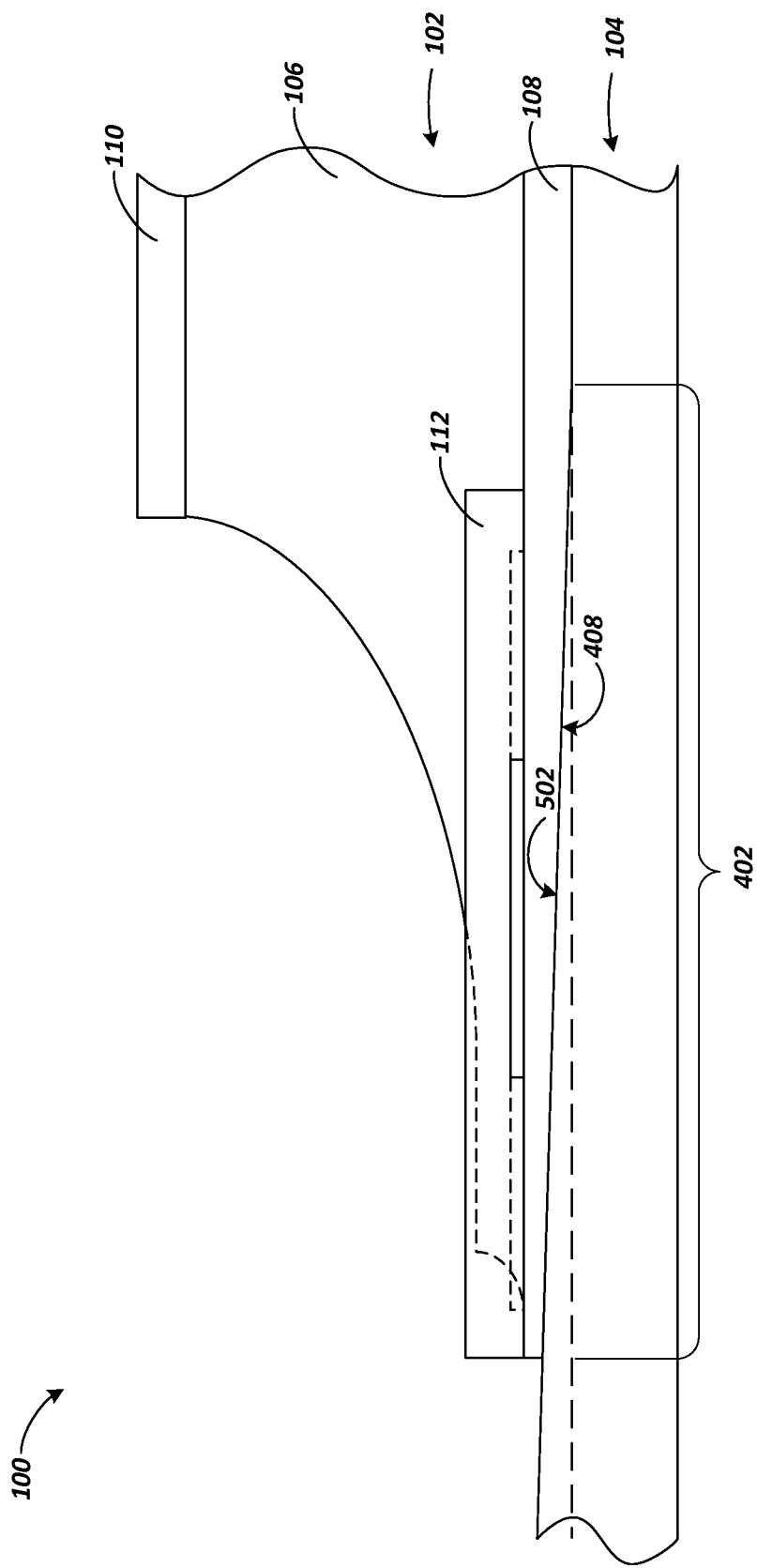
FIG. 5 is a side view of a stiffener runout assembly illustrating aspects of a stiffener runout and alternative scarf joint for controlling disbond according to various embodiments presented herein.

FIGS. 4 and 5 illustrate two alternative embodiments in which a type of scarf joint 402 is created between the stiffener runout 102 and the composite structure 104. For the purposes of this disclosure, the term "scarf joint" will be used to refer to a coupling between two or more components in which two of the components are manufactured or modified to have an angled surface that is engaged with a complementary angled surface of the other component. FIG. 4 shows a first embodiment in which the composite structure 104 has a uniform thickness, but is bonded to a fiberglass wedge 404. The fiberglass wedge 404 is hatched in the FIG. 4 to highlight the wedge for clarity purposes only. The fiberglass wedge 404 provides an angled wedge surface 406 that is co-cured into an angled flange surface 408 of the base flange 108. The angled flange surface 408 may be created by reducing the plies of the composite material according to the desired angle and joint length. The fiberglass wedge 404 is highly compliant and is configured to shear load into the composite structure 104 over a longer length, thereby reducing the local moments that may cause disbonding. Although the fiberglass wedge 404 is described herein as being fiberglass, it should be appreciated that any suitable material that is more compliant (having less stiffness) than the material of the stiffener runout 102 and composite structure 104 may be used to create the wedge.

FIG. 5 shows the second embodiment in which the scarf joint 402 is created by reducing the plies of the composite material according to the desired angle of the angled flange surface 408 and length of the scarf joint 402. Similarly, the corresponding angled structure surface 502 may be created by increasing plies of the composite material according to the desired angle of the angled structure surface 502 and length of the scarf joint 402. The result is a non-uniform thickness of the base flange 108 that complements a non-uniform thickness of the composite structure 104 within the scarf joint 402. According to an example embodiment, the run to rise ratio associated with the angled structure surface 502 and angled flange surface 408 of the scarf joint 402 is approximately 20:1. According to various embodiments, the ratio may be between 20:1-30:1. Similar to the effect of a scarf joint 402 created with the fiberglass wedge 404 discussed above with respect to FIG. 4, the effect of the scarf joint 402 created by altering the plies of the base flange 108 and composite structure 104 as shown in FIG. 5 is to shear the loads from the stiffener into the composite structure 104 over a relatively long distance. Doing so minimizes the detrimental local moments by reducing the offset in the load line that may initiate disbonding.

Figure 6:
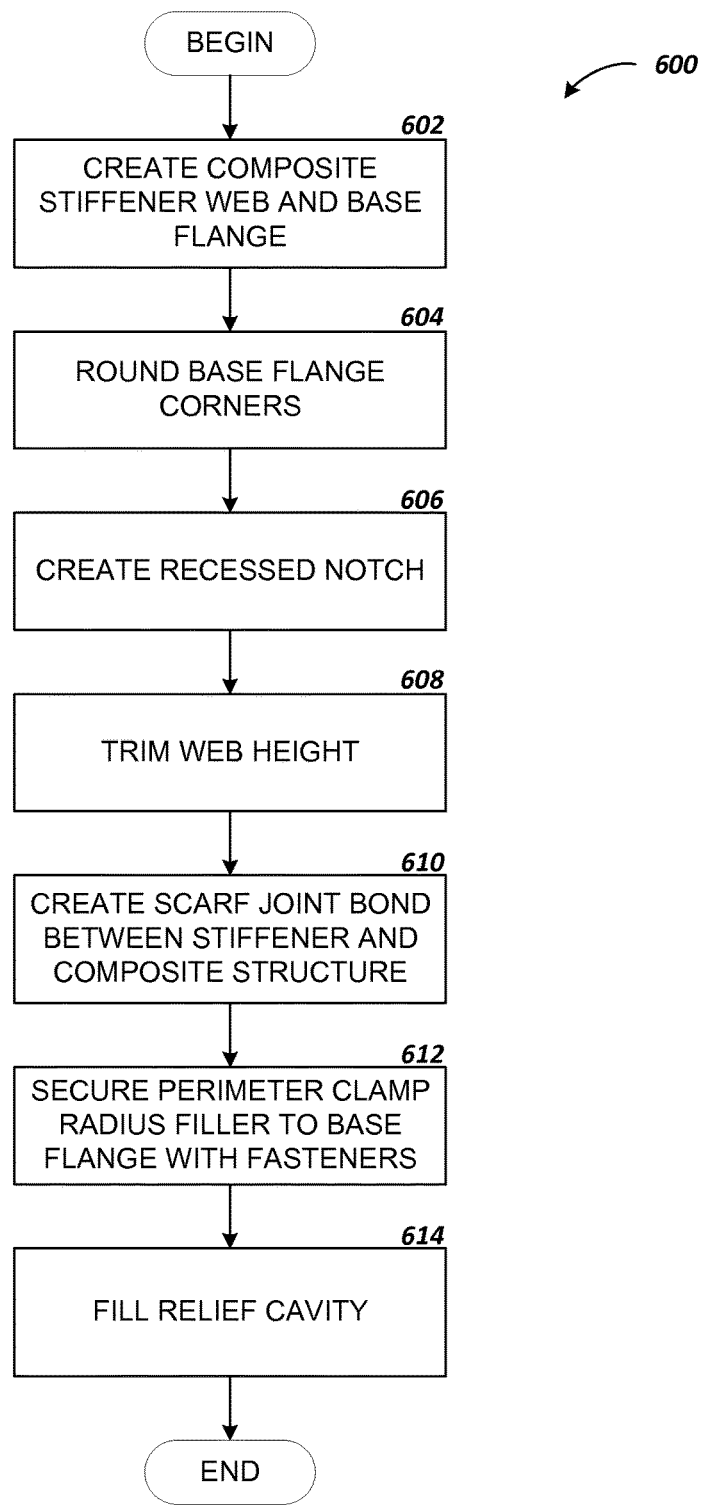
FIG. 6 is a flow diagram showing a method of controlling bondline separation between a composite stiffener and a composite structure according to various embodiments presented herein.

Turning now to FIG. 6, an illustrative routine 600 for controlling bondline separation between a stiffener runout 102 and a composite structure 104 will now be described in detail. It should be appreciated that more or fewer operations may be performed than shown in the FIG. 6 and described herein. Moreover, these operations may also be performed in a different order than those described herein. The routine 600 begins at operation 602, where the stiffener runout 102 having a web 106 and a base flange 108 of composite materials is created. It should be appreciated that other features of a stiffener that are not germane to this disclosure may additionally be created during this or any other operation of the routine 600. For example, creation of the stiffener may commonly include bonding the cap 110 to the top edge of the web 106, as well as bonding the noodle 114 in the appropriate position between the bottom edge of the web 106 and the first and second flange portions 108A and 108B.

From operation 602, the routine 600 continues to operation 604, where the rounded corners 202 of the base flange 108 are created. This operation may be performed by trimming conventional square corners after curing of the base flange 108, or may be a part of the composite molding process. At operation 606, the recessed notch 204 is created in the base flange 108. The recessed notch 204 may be created via trimming material from the base flange 108 or may be created during the material composite molding process. The size and depth of the recessed notch 204 may depend on the particular implementation and the desired distance between the flange termination point 206 and the web termination point 208. The routine 600 continues from operation 606 to operation 608, where the height of the web 106 is trimmed from the full height 304 to the reduced height 306 at the web termination point 208. The leading edge 302 of the web 106 may be trimmed according to a curved configuration or linearly tapered to the reduced height 306.

From operation 608, the routine 600 continues to operation 610, where the scarf joint 402 is created between the stiffener runout 102 and the composite structure 104. As discussed above with respect to FIG. 4, a first method for creating the scarf joint 402 involves utilizing a fiberglass wedge 404 bonded to a top surface of the composite structure 104, providing an angled wedge surface 406 that is co-cured into an angled flange surface 408 of the base flange 108. The angled flange surface 408 of the base flange 108 may be created by dropping plies to create the desired 20:1-30:1 or other ratio at the scarf joint 402. Also as discussed above with respect to FIG. 5, a second method for creating the scarf joint 402 includes dropping plies in the base flange 108 to create the angled flange surface 408 and increasing plies in the composite structure 104 to create the angled structure surface 502. The angled flange surface 408 and the angled structure surface 502 are then co-cured to create the scarf joint 402.

The routine 600 continues from operation 610 to operation 612, where the perimeter clamp radius fillers 112 are secured to the base flange 108 with fasteners 214. Torque is applied to the fasteners 214 to concentrate a clamping force within the contact area 210 against the perimeter of the base flange 108 to mitigate disbonding in these areas. At operation 614, the relief cavity 212 is filled with a compliant sealant or other material and the routine 600 ends.

During use, loads from the stiffener runout 102 may be sheared into the composite structure 104 at the scarf joint 402 over a relatively long distance to reduce the offset in the load line that could initiate a disbond between the stiffener runout 102 and the composite structure 104. These loads may include a first loading condition in which static loads are experienced, such as during a steady straight and level aircraft flight operation. The loads may shift to a second loading condition in which dynamic loads are experienced, such as during a climb, turn, or velocity change. During this load shift, the scarf joint 402 and other features of the stiffener runout 102 described above serve to distribute the loads to the composite structure 104 in a manner that prevents or delays the disbonding that may be present with conventional stringer runouts.

It should be clear from discussion above that the concepts described herein may be used independently or in combination to mitigate disbonding at the stiffener runout 102 under operational loads. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A stiffener runout, comprising:
a web configured in a substantially vertical orientation and including a front surface, a rear surface, a bottom edge, and a web termination point positioned at an outermost location of the web, wherein a height of the web decreases from a full height at a location prior to the web termination point to a reduced height at the web termination point;
a base flange, comprising
a first flange portion adjacent to the bottom edge of the web and extending substantially horizontally from the front surface of the web, and
a second flange portion adjacent to the bottom edge of the web and extending substantially horizontally from the rear surface of the web,
wherein the base flange includes a flange termination point positioned at an outermost location of the base flange and forward of the web termination point; and
a perimeter clamp radius filler, wherein the perimeter clamp radius filler is configured to contact a top surface of the first flange portion around a portion of a perimeter of the top surface to create a contact area between the perimeter clamp radius filler and the portion of the perimeter of the top surface, and wherein the contact area defines a relief cavity between the perimeter clamp radius filler and the top surface.

2. The stiffener runout of claim 1, wherein the base flange comprises a recessed notch at the flange termination point at a central location aligned with the web such that the web termination point is positioned substantially at a center of the recessed notch.

3. The stiffener runout of claim 2, wherein the recessed notch comprises an arcuate edge such that the web termination point is located on the arcuate edge.

4. The stiffener runout of claim 2, wherein the base flange comprises a plurality of rounded corners at the flange termination point.

5. The stiffener runout of claim 1, further comprising a compliant filler disposed within the relief cavity.

6. The stiffener runout of claim 1, wherein the contact area is substantially C-shaped such that an opening to the relief cavity is positioned along an edge of the perimeter clamp radius filler.

7. The stiffener runout of claim 6, wherein the opening to the relief cavity is positioned along the edge of the perimeter clamp radius filler opposite an edge of the perimeter clamp radius filler adjacent to the web.

8. The stiffener runout of claim 1, further comprising a plurality of fasteners extending through a top surface of the perimeter clamp radius filler, through the relief cavity, through the first flange portion, and through a structure to which the stiffener runout is attached via the plurality of fasteners.

9. The stiffener runout of claim 1, wherein a forward edge of the web from the location prior to the web termination point to the web termination point is substantially curved.

10. The stiffener runout of claim 1, further comprising a structure bonded to a bottom surface of the base flange according to a scarf joint.

11. The stiffener runout of claim 10, wherein the scarf joint comprises a fiberglass wedge bonded to a top surface of the structure, wherein the structure comprises a substantially uniform thickness, and wherein the base flange comprises a non-uniform thickness corresponding to a configuration of the fiberglass wedge.

12. The stiffener runout of claim 10, wherein the structure comprises a non-uniform thickness, and wherein the base flange comprises a non-uniform thickness corresponding to the non-uniform thickness of the structure.

\* \* \* \* \*